United States Patent
Spanjers (10) Patent No.: US 11,018,893 B2
(45) Date of Patent: May 25, 2021

(54) SWITCH DEVICE FOR AN AUTOMATION NETWORK

(71) Applicant: OMRON Corporation, Kyoto (JP)

(72) Inventor: Jasper Spanjers, the Netherlands (NL)

(73) Assignee: OMRON Corporation, Kyoto (JP)

( * ) Notice: Subject to any disclaimer, the term of this patent is extended or adjusted under 35 U.S.C. 154(b) by 2 days.

(21) Appl. No.: 16/605,215

(22) PCT Filed: May 30, 2018

(86) PCT No.: PCT/IB2018/000574
§ 371 (c)(1),
(2) Date: Oct. 15, 2019

(87) PCT Pub. No.: WO2018/220435
PCT Pub. Date: Dec. 6, 2018

(65) Prior Publication Data
US 2020/0127869 A1 Apr. 23, 2020

(30) Foreign Application Priority Data
May 31, 2017 (EP) ..................... 17173754

(51) Int. Cl.
*H04L 12/407* (2006.01)
*H04L 12/66* (2006.01)
*H04L 12/40* (2006.01)

(52) U.S. Cl.
CPC ...... *H04L 12/40006* (2013.01); *H04L 12/407* (2013.01); *H04L 12/4015* (2013.01); *H04L 12/40176* (2013.01); *H04L 12/66* (2013.01)

(58) Field of Classification Search
CPC ............. H04L 12/40006; H04L 12/407; H04L 12/4015; H04L 12/40176; H04L 12/66
See application file for complete search history.

(56) References Cited

U.S. PATENT DOCUMENTS 6,868,097 B1 * 3/2005 Soda ................ H04J 3/247
340/2.81
8,832,346 B2 * 9/2014 Kiris .................. G06F 13/4018
710/306

(Continued)

FOREIGN PATENT DOCUMENTS

CN  101233461  7/2008
CN  102959482  3/2013

(Continued)

OTHER PUBLICATIONS

Io-Link Community Japan, "Technology and Application", Apr. 2017, Available at: http://www.io -] Link.jp/download/IO-Link_System_Description_201704.pdf., pp. 1-20.

(Continued)

*Primary Examiner* — Rasheed Gidado
(74) *Attorney, Agent, or Firm* — JCIPRNET (57) ABSTRACT

A switch device for connecting a plurality of field devices to one single master port of a master device, the master device providing a gateway between the field devices and an upper level network and being configured to control a communication between the upper level network and the field devices, the switch device comprising: a physical master-side port for connecting the switch device to the single master port and for establishing a master communication channel between the same; and a plurality of physical field device-side ports for connecting the switch device to the field devices and for establishing a plurality of field device communication channels between the respective field devices and the switch device; wherein the switch device is configured to transfer data between the master device (3) and the field devices through the master communication channel and the field device communication channels using a single communication protocol for an automation network.

19 Claims, 5 Drawing Sheets

(56) References Cited

U.S. PATENT DOCUMENTS

| | | | | |
|---|---|---|---|---|
| 9,507,661 | B2* | 11/2016 | Breuninger | G06F 13/364 |
| 9,846,609 | B2* | 12/2017 | Ratilla | G05B 19/0425 |
| 10,572,420 | B2* | 2/2020 | Niwa | G06F 13/4282 |
| 2008/0109656 | A1* | 5/2008 | Kotzin | H04W 12/08 |
| | | | | 713/165 |
| 2010/0146182 | A1 | 6/2010 | Gutekunst et al. | |
| 2013/0222123 | A1* | 8/2013 | Wessling | G05B 19/0423 |
| | | | | 340/12.22 |
| 2014/0047056 | A1* | 2/2014 | Tahara | H04L 41/046 |
| | | | | 709/208 |
| 2015/0293871 | A1* | 10/2015 | Rahamim | H04L 12/437 |
| | | | | 710/106 |
| 2016/0029024 | A1* | 1/2016 | Shand | H04N 19/428 |
| | | | | 375/240.03 |

FOREIGN PATENT DOCUMENTS

| | | |
|---|---|---|
| DE | 102011003309 | 8/2012 |
| EP | 1090333 | 4/2001 |
| JP | H11215176 | 8/1999 |
| JP | 2002051047 | 2/2002 |
| JP | 2016165062 | 9/2016 |

OTHER PUBLICATIONS

Office Action of Japan Counterpart Application, with English translation thereof, dated Oct. 27, 2020, pp. 1-14.
"International Search Report (Form PCT/ISA/210) of PCT/IB2018/000574," dated Aug. 9, 2018, pp. 1-3.
"Written Opinion (Form PCT/ISA/237) of PCT/IB2018/000574", dated Aug. 9, 2018, pp. 1-8.
"Office Action of China Counterpart Application", dated Feb. 26, 2021, with English translation thereof, p. 1-p. 20.

* cited by examiner

SWITCH DEVICE FOR AN AUTOMATION NETWORK

CROSS-REFERENCE TO RELATED APPLICATION

This application is a 371 of international application of PCT application serial no. PCT/IB2018/000574, filed on May 30, 2018, which claims the priority benefit of European application no. 17173754.7, filed on May 31, 2017. The entirety of each of the abovementioned patent applications is hereby incorporated by reference herein and made a part of this specification.

The present invention relates to a switch device for connecting a plurality of field devices to one single master port of a master device. Moreover, the present invention relates to an automation network.

In automation networks, master devices can provide interfaces between an upper level network, for example a fieldbus network, and field devices, in particular IO-link devices. The amount of field devices that can be connected to the master device is usually limited by the amount of master ports provided by the master device. To overcome the difficulty of connecting more field devices to a first master device than it provides master ports, a switch device may be placed between the field devices and the master device.

For example, in the IO-link technology, it is known to use a second master device as the switch device. Namely, the second master device can be connected to one port of the first master device through a fieldbus connection, thereby increasing the number of ports available for the field devices downstream of the first master device. A communication between the first and second master devices is performed over a fieldbus communication.

Furthermore, document US 2010/0146182 A1 shows another type of switch device, namely a hub or field bus module which connects a plurality of field devices to a control unit in an Ethernet-based network. Thereby, analog and digital data can be communicated between the field devices and the control unit.

This bears the disadvantage that the protocols are different so that a protocol conversion is needed between the master and the field devices that are connected via the hub. Hence the prior art solution requires an increased complexity and is therefore more expensive.

It is one object of the present invention to overcome the disadvantages of the prior art and to provide an improved switch device. A further object of the present invention is to provide an improved automation network.

Accordingly, a switch device for connecting a plurality of field devices to one single master port of a master device is provided, the master device providing a gateway between the plurality of field devices and an upper level network and being configured to control a communication between the upper level network and the plurality of field devices. The switch device comprises: a physical master-side port for connecting the switch device to the single master port and for establishing a master communication channel between the master device and the switch device; and a plurality of physical field device-side ports for connecting the switch device to the plurality of field devices and for establishing a plurality of field device communication channels between the respective field devices and the switch device. The switch device is configured to transfer data between the master device and the plurality of field devices through the master communication channel and the plurality of field device communication channels using a single communication protocol for an automation network.

According to a further aspect, an automation network is provided. The automation network comprises: an upper level network; a plurality of field devices; a master device providing a gateway between the plurality of field devices and the upper level network and being configured to control a communication between the upper level network and the plurality of field devices; and the switch device defined above and below.

In embodiments, the switch device allows to establish a plurality of IO-link channels between a single physical IO-link port of the master device and IO-link devices as field devices.

The automation network may be an industrial automation system for manufacturing a product such as a microchip or a car, or for analyzing the properties of a product, for example of a biological sample or of an integrated circuit.

The upper level network may comprise a control system for the automation network, for example including a personal computer, user interfaces and storage devices, which can be connected to the master device through a fieldbus, a backplane bus, or an industrial Ethernet connection.

The master device may establish the connection between the plurality of field devices and the upper level network. In particular, the master device stores information indicating which field devices it is connected to. For example, the master device comprises a master storage unit in which the architecture of the field devices is mapped together with parameters relating to each field device. The field devices may be complex and/or intelligent sensors and actuators of any kind. For example, the field devices may comprise valves, robot tools, motor starters, I/O modules, input units and the like. The plurality of field devices may be a combination of different field devices. Each field device may have its own address, which allows the master device to map the system of field devices and to configure the switch device accordingly.

In particular, the switch device, which may also be called "connector", is a physical device provided between the plurality of field devices and the master device. The master device may comprise a plurality of physical ports, to each of which one device, for example one field device, can be connected. The switch device is connected to a single one of these physical ports, also called "the single master port". In turn, a plurality of field devices can be connected to the switch device. Thereby, a plurality of field devices are connected to the single master port via the switch device. Through the switch device, it is for example possible to increase the number of field devices connected to the master device.

In embodiments, the switch device allows to couple more field devices to a master device than physical ports are available at the master device, and at the same time providing a point-to-point communication between each of the field devices and the master device.

Configuring the switch device can include providing the switch device with information indicating which field devices the switch device is connected to. In particular, the switch device may be unable to configure itself. Rather, it may have to be configured by the master device. This is a major difference between the master device and the switch device. Namely, the master device can configure itself based on information obtained from the field devices connected thereto, while the switch device may require information from the master device to become ready to use. Further, the switch device may not be able to function in a network without a master device. In particular, the switch device may not be able to generate any data for transmission itself. The switch device can be considered as less performing than the master device, in particular in terms of intelligence.

Thus, in embodiments, the switch device may be implemented not to perform any control functions and/or generating transmission data in addition to data received and transmitted from and to the master and the field devices.

The master device may have to support the switch device to communicate with the field devices through the switch device. For example, the master device supports only a specific type of switch device produced by the same producer as the master device. The switch device may comply with any type of field devices.

The connection between the master device and the switch device may be realized over the master communication channel, which is in particular established between the single master port of the master device and the physical master-side port of the switch device.

The connection between the plurality of field devices and the switch device may be realized over the plurality of field device communication channels, which are in particular established between the plurality of physical field device-side ports of the switch device and the respective field devices. The plurality of field devices may be connected to the plurality of field device-side ports through field ports on the respective field devices.

The single master port, the master-side port, the plurality of field device-side ports and/or the plurality of field ports may for example be pin-ports, IO-link ports, USB-ports, wireless receivers/transmitters, or any type of physical connectors. The connection between the master-side port and the single master port as well as the connection between the field device-side ports and the respective field devices may be performed using a connecting cable or wirelessly, for example using Bluetooth or Wi-Fi.

Data to be transmitted from the master device to the respective field devices or from the field devices to the master device may be transmitted via the switch device, in particular using the master communication channel and the field device communication channels defined here-above. In particular, the communication protocol used for transferring data through the master communication channel is identical to the communication protocol used for transferring data through the plurality of field device communication channels. The identical communication protocols are herein referred to as "single communication protocol". Said single communication protocol may be an IO-link communication protocol, which will be detailed below.

The switch device may have the exclusive function of transferring data back and forth between the master device and the field devices.

The communication between the master device and the plurality of field devices may be a point-to-point communication, in particular a SDCI (single-drop digital communication interface) communication. Namely, the master device may send data to a specific field device selected from the field devices. To achieve such a point-to-point communication, the master device may use his knowledge about which field devices it is connected to through the switch device.

By using a single communication protocol in the communication between the master device and the field devices, a loss of information may be avoided. In particular, the transferred data is maintained without modification or alternation in the switch device, thereby improving an efficiency of the data transfer. For example, data is transmitted between the master device and the field devices exclusively as raw data, including in the switch device.

The proposed switch device allows to link a plurality of field devices to only one master port of the master device. Thereby, it is possible to considerably increase the amount of field devices connected to the master device. In particular, several switch devices can be connected to a same master device, thereby increasing the amount of field devices that can be connected to the master device even further. Therefore, the amount of field devices used in the automation network can be increased without having to use an additional master device. This can reduce the costs of the automation network.

Further, if cables are used to connect the field devices to the master device, the amount of cables going to the master can be reduced using the switch device. Thereby, cabling mistakes may be avoided. Further, reducing the amount of used cables is particularly advantageous when the master device cannot properly be reached.

Furthermore, the proposed switch device can facilitate an exchange of field devices connected to the master device. Indeed, several sets of field devices can be pre-connected to several switch devices. Then, if the switch device connected to the master device is exchanged, the field devices connected to the master device are also exchanged. This is particularly useful in applications having limited amount of space for connections, such as robot heads, for example.

Moreover, a physical distance between the master device and the field devices can be increased using wireless, in particular optical wireless connections between the master device and the switch device and between the switch device and the field devices. This is particularly advantageous in hazardous environments since cable break can thereby be prevented. Further, the wireless connections allow the use of moving field device without requiring cables.

According to a further embodiment, the communication protocol is an IO-link communication protocol. In particular, data transmitted through the master communication channel and the plurality of field device communication channels is transmitted according to the IO-link standard.

The IO-link standard in particular refers to the internationally standardized I/O technology (IEC 61131-9) for communicating with field devices. For such an IO-link communication, the single master port, the master-side port, the plurality of field device-side ports and/or the plurality of field ports may be IO-link ports which are adapted for IO-link communication.

The IO-link communication protocol is in particular defined in that data is transmitted at one of the transmission rates defined by the standard. The types of data exchanged may comprise cyclic process data, including process data inputs and outputs; acyclic field device parameters, which are sent by the field devices only upon request from the master device; and acyclic event data, which are sent by the field device to signalize an error, a warning or a notification, for example. The data may be transferred in frames having a specific structure, for example as F or M-sequences comprising a first or request message from the master device directed to a selected field device and a second or response message from said field devices. In particular, a point-to-point SDCI communication is performed between the master device and each of the field devices.

Using the IO-link communication protocol as the communication protocol can increase the reliability of the data transmission between the master device and the field devices. In particular, if the master device does not receive a response to its request from the field device, the request may be resent twice. An error notification may be issued by the master only if these two further attempts also fail.

In embodiments, the master communication channel and/or the field device communication channel is not a fieldbus. For example, the master communication channel and/or the field device communication channel can be an IO-link communication channel rather than a channel relying on a fieldbus infrastructure such as EtherCAT.

According to a further embodiment, the master device is an IO-link master device and at least one field device from the plurality of field devices is an IO-link device.

In particular, IO-link devices are field devices which support the IO-link specification. The IO-link devices may be SDCI-compliant field devices. The IO-link devices can in particular transmit and receive data to/from the switch device at one of the transmission rates defined by the IO-link standard.

Further, the IO-link master may be a master device supporting the IO-link specification. The IO-link master may be a SDCI-compliant master device. The IO-link master can in particular transmit and receive data to/from the switch device at all of the transmission rates defined by the IO-link standard.

The IO-link master, the IO-link device(s) and the switch device may form a single IO-link system. In particular, IO-link systems comprise only one IO-link master. Using the switch device defined above and below, the total number of field devices in a single IO-link system can be increased.

According to a further embodiment, the switch device further comprises a downstream transmission unit provided between the master-side port and the plurality of field device-side ports, which is configured to cyclically or acyclically transmit downstream data received from the master device at the master-side port to a selected field device-side port selected from the plurality of field device-side ports, the selected field device-side port being selected in accordance with a destination information received with the downstream data and indicating the field device to which the downstream data is destined to.

Herein, "downstream" refers to a direction that goes from the master device towards one of the field devices, in particular via the switch device. To transmit data from the master device to one of the field devices, for example control data for controlling the field device or a request to the field device, the data may be transmitted as downstream data to the switch device through the master communication channel. The downstream data can encompass or be associated to the destination information indicating the field device (selected field device), out of the plurality of field devices, to which the downstream data is destined to. The destination information is in particular associated to the downstream data by the master device.

The downstream transmission unit may extract and/or read the destination data from the received downstream data and transmit the downstream data to the selected field device-side port connected to the selected field device to which the downstream data is destined to according to the destination information. To this extend, the switch device may have to know which field devices it is connected to, in particular which field device is connected to which of the field device-side ports of the switch device. For example, information about the field devices connected to the switch device can be stored as a field device configuration parameter in a switch storage unit of the switch device. The field device configuration parameter may be stored in the storage unit by the master device when configuring the switch device.

The switch device may thus have the function of directing the downstream data towards the field device it is destined to. The switch device may play a major role in achieving the point-to-point communication, especially if the data is transmitted according to the IO-link protocol. In particular, the present switch device can achieve passing downstream data from the master device to the selected field device without changing the data format.

According to a further embodiment, the downstream data received from the master device at the master-side port is a downstream data packet comprising a plurality of downstream messages each having a downstream message information associated thereto as the destination information; and wherein
 the switch device further comprises an unpacking unit provided between the master-side port and the downstream transmission unit configured to unpack the downstream messages of the downstream data packet and to transmit them to the downstream transmission unit together with their respective downstream message information.

The downstream data packet may comprise a bulk or a plurality of downstream messages destined to different field devices from the plurality of field devices. Each of the downstream messages may be generated or transmitted by the master device, which moreover adds or associates the destination information to each of the downstream messages and groups the several downstream messages together in the downstream data packet. The downstream data packet received by the switch device may be unpacked by the unpacking unit to separate the different downstream messages. Then, the different downstream messages can be transmitted from the unpacking unit to the downstream transmission unit, which in particular transfers each of the downstream messages to the selected field device-side port connected to the selected field device to which the downstream message is destined to according to its destination information. The unpacking unit and the downstream transmission unit may be a single physical unit.

The switch device may distribute the different downstream messages received in the downstream data packet to the selected field devices. A large amount of downstream data can thereby be transferred to the respective field devices, without having to increase a transmission rate for transmitting data between the master device and the switch device because the downstream data is sent in downstream data packets. Thereby, the switch device is further improved.

According to a further embodiment, the switch device further comprises an upstream transmission unit provided between the master-side port and the plurality of field device-side ports, which is configured to cyclically or acyclically transmit upstream data received from one of the field devices at the corresponding field device-side port to the master-side port.

Herein, "upstream" refers to a direction that goes from one of the field devices towards the master device, in particular via the switch device. To transmit data from one of the field devices to the master device, for example sensor data sensed by the field device or a response to a request received from the master device, the data may be transmitted as upstream data or as an upstream message to the switch device through the field device communication channel corresponding to the field device from which the upstream data is transferred.

According to a further embodiment, the upstream transmission unit transmits the upstream data to the master-side port together with an originator information indicating which field device the upstream data originates from.

The upstream transmission unit may associate the originator information indicating the field device out of the plurality of field devices from which the upstream data is originating to the upstream data.

The originator information may be considered as metadata. It may be associated to the upstream data by the switch device, in particular by the upstream transmission unit, for example using the information about the field devices connected to the switch device stored in the storage unit. The switch device, in particular the upstream transmission unit may associate further metadata to the upstream data. The originator information may alternatively be associated to the upstream data by the originator field device itself.

A downstream data message and a following upstream data message may be considered as a sequence exchanged by the master device and the field device, in particular if the master device is an IO-link master and the field devices are IO-link devices.

The switch device may thus have the function of directing the upstream data towards the master device, together with the originator information. The master device may be capable of managing the upstream data received through the switch device. In particular, the present switch device can achieve passing upstream data from the field device to the master device. The master device may pass the received upstream data to the upper-level network.

According to a further embodiment, the upstream data received from the respective field devices at the corresponding field device-side ports is an upstream message; and wherein
the switch device further comprises a packing unit provided between the upstream transmission unit and the master-side port and configured to pack-up at least two upstream messages received from at least two field-devices through the corresponding field device-side ports into an upstream packet, and to transmit said upstream packet to the master-side port.

The packing unit may collect upstream messages received from several field devices. It may also associate the originator information therewith. In embodiments, the packing-up of the at least two upstream messages into an upstream packet includes a compressing or an encapsulation of the at least two upstream messages by the packing unit. The collected upstream messages are in particular clustered or compressed in a bulk to form the upstream packet, which can be transmitted to the upstream transmission unit in the same way as the above-described upstream data. The upstream transmission unit may transmit the upstream packet to the master device, which can unpack the upstream packet to obtain the individual upstream messages from the field devices. The upstream transmission unit and the packing unit can be one single physical unit.

A large amount of upstream data can thereby be transferred to the master device at once, without having to increase the transmission rate for transmitting data between the master device and the switch device because the upstream data is sent in upstream data packets.

According to a further embodiment, the switch device further comprises a storage unit for storing configuration data, including at least one of:
a field device transmission rate for each of the field device-side ports indicating a rate at which data can be transmitted through the respective field device communication channels in agreement with a transmission rate supported by the corresponding field devices;
a master transmission rate for the master-side port indicating a rate at which data can be transmitted through the master communication channel in agreement with a transmission rate supported by the master device;
a master cycle time indicating a time it takes to transmit downstream or upstream data between the master device and the switch device through the master communication channel; and
a field device cycle time indicating a time it takes to transmit downstream or upstream data between the one of the field devices and the switch device through the corresponding field device communication channel.

The field and master transmission rates may be examples for the above-mentioned transmission rates. The respective transmission rates may here correspond to baud rates. In particular, each field device may only support a specific transmission rate, which may be taken into consideration by the switch device when communicating with the field device through the field device communication channel. For example, downstream data transmitted to the respective field devices may only be transmitted in accordance with the stored field device transmission rates.

Moreover, the master device may support one or several specific master transmission rates, which can be taken into consideration by the switch device when communicating with the master device through the master communication channel. For example, upstream data transmitted to the master device may only be transmitted in accordance with the stored master transmission rate(s).

The master cycle time may be made of the length of upstream or downstream messages transmitted in the master communication channel and of delay times in the master device and the switch device. Moreover, the field device cycle time, which can be specific to each field device, may be made of the length of upstream or downstream messages transmitted in the field device communication channel 10' and of delay times in the respective field device and the switch device.

According to a further embodiment, the switch device further comprises a configuration unit for setting a field device configuration parameter for each field device connected to the switch device, the field device configuration parameter including at least one of the field device transmission rate and the field device cycle time of each field device, and/or for setting a master configuration parameter for the master device connected to the switch device, the master configuration parameter including at least one of the master transmission rate and the master cycle time.

In particular, when the field devices are first connected to the switch device, the configuration unit of the switch devices receives field configuration parameters from the connected field devices. These may also include information about which field device is connected to which field device-side port of the switch device. The field device configuration parameters may be obtained as a response to a request from the master device. The field device communication channels may be set up under consideration of the respective received field device configuration parameters.

Further, when the switch device is first connected to the master device, the configuration unit of the switch devices can receive master configuration parameters from the connected master device. The master communication channel may be set up under consideration of the received master configuration parameters. The master and field configuration parameters are in particular stored in the storage unit.

According to a further embodiment, the master communication channel and/or the field device communication channel are set up under consideration of at least one of the field device transmission rate, the master transmission rate, the master cycle time and the field device cycle time.

The switch device can flexibly setup the field and master communication channels in agreement with configuration parameters received from the master device and the field devices when it is first connected therebetween. When one or several field device are removed, added or exchanged, the configuration unit may update the configuration parameters. Hence, a flexible switch device is provided.

According to a further embodiment, the switch device further comprises a field device stack for controlling the transmission of data between the master device and the field devices. In particular, the field device stack works together with the various units of the switch device, such as the packing and unpacking unit, the downstream and upstream transmission unit, the storage unit and the configuration unit, to set up the master communication channel and the field device communication channels, and to realize the transmission of data between the master device and the field devices.

According to a further embodiment, the master device comprises a master stack for controlling the transmission of data between the master device and the switch device. In particular, the master stack controls the registration of the field devices with the master device and sets up the communication with the switch device.

Further possible implementations or alternative solutions also encompass combinations—that are not explicitly mentioned herein—of features described above or below with regard to the embodiments. The person skilled in the art may also add individual or isolated aspects and features to the individual embodiments.

Further embodiments, features and advantages of the present invention will become apparent from the subsequent description and dependent claims, taken in conjunction with the accompanying drawings, in which:

In the Figures, like reference numerals designate like or functionally equivalent elements, unless otherwise indicated.

In this disclosure, "IO-link" refers to a technology for communicating with sensors and actuators according to the international standard IEC 61131-9 and compatible, in particular, subsequent standards. It is intended that the term "IO-link" also covers devices and communication protocols according to European standards EN 61131 and EN 61499.

Figure 1:
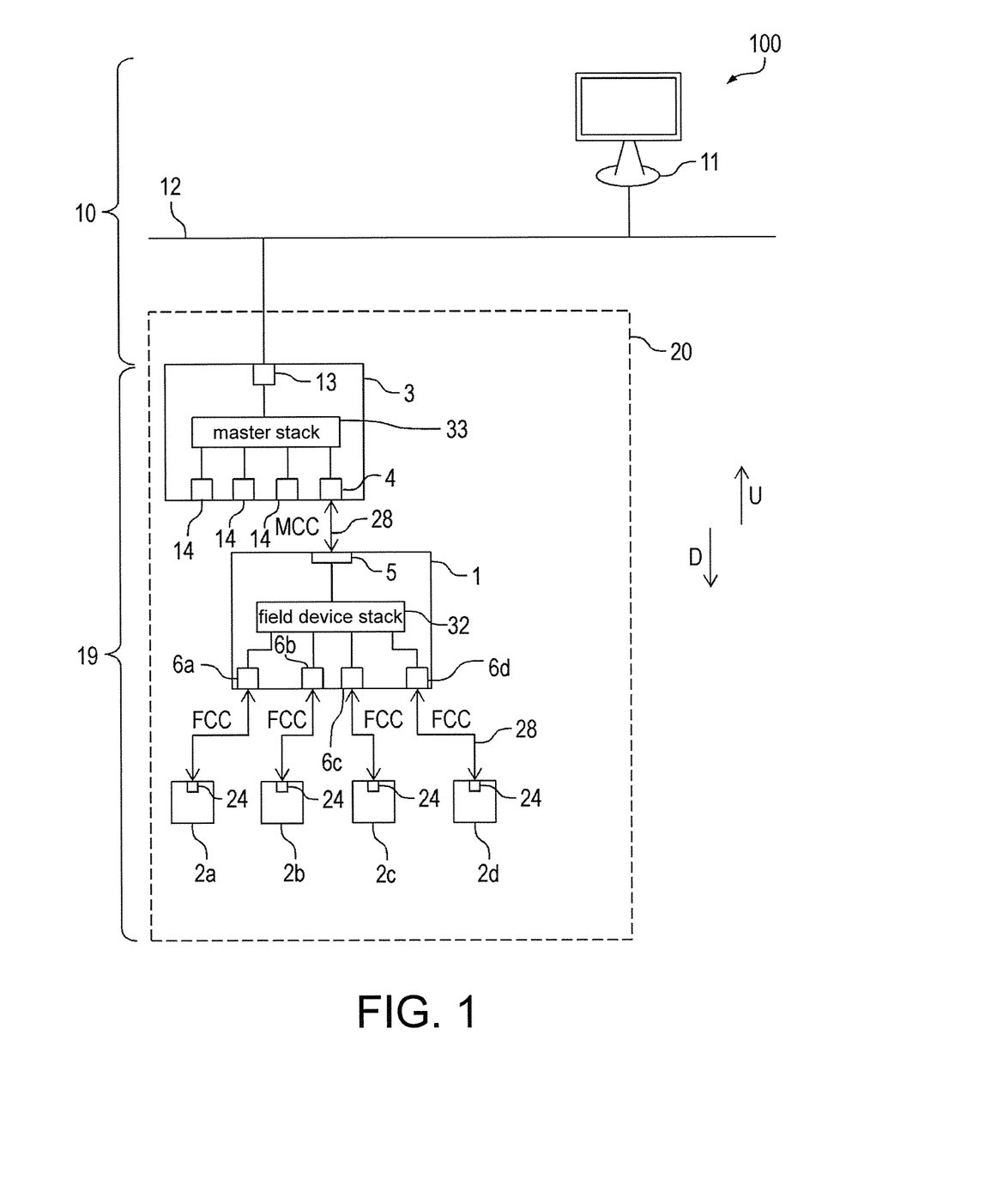
FIG. 1 shows an automation network according to a first embodiment.

FIG. 1 shows an automation network 100 according to a first embodiment. The automation network 100 is a factory automation system for producing a product such as a microchip. The automation network 100 comprises an upper level network 10 and a lower level network 19. The upper level network 10 controls the lower level network 19 by means of a control unit, which is a personal computer (PC) 11 in the example of FIG. 1. The PC 11 is connected to a network port 13 of a master device 3 over an industrial Ethernet connection 12. The master device 3 is controlled by a master stack 33 and offers an interface or a gateway between the upper and lower level networks 10, 19, thereby allowing a communication between the upper and lower level networks 10, 19.

The lower level network 19 comprises not only the master device 3, but also a plurality of four field devices 2a-2d connected to the master device 3 via a switch device 1. In the example of FIG. 1, the master device 3 is an IO-link master and the individual field devices 2a-2d are all IO-link devices. The IO-link master device 3, the switch device 1 and the four IO-link devices 2a-2d form an IO-link system 20. The IO-link devices 2a-2d are intelligent devices which respond to requests from the IO-link master 3. The IO-link devices 2a and 2b are here motors for displacing the product in production, the IO-link device 2c is a drill and the IO-link device 2d is an I/O module.

To ensure the connection between the IO-link master 3 and the IO-link devices 2a-2d, the IO-link master 3 comprises, on a downside thereof, a plurality of master ports 4, 14. The master ports 4, 14 are IO-link ports for performing SDCI communication according to the IO-link standard. To each of the master ports 4, 14, there can only be connected one device of any kind at a time. In FIG. 1, the switch device is connected to one of the master ports from the plurality of master ports 4, 14, namely to the master port 4 via a cable 28. The remaining master ports 14 in FIG. 1 remain unused. The connection between the IO-link master 3 and the switch device 1 thus occurs through the master port 4 of the IO-link master 3 and a master-side port 5 of the switch device 1. The master-side port 5 is also an IO-link port.

Between the master port 4 and the master-side port 5, a master communication channel MCC is established to allow a communication between the IO-link master 3 and the switch device 1. The communication through the master communication channel MCC is bidirectional: the IO-link master 3 can transfer data towards the switch device 1 in a downstream transmission direction D and receive information from the switch device 1 in an upstream transmission direction U.

The switch device 1 is moreover connected to the IO-link devices 2a-2d through physical field device-side ports 6a-6d, which are here IO-link device-side ports. The IO-link device-side ports 6a-6d are IO-link ports for performing SDCI communication according to the IO-link standard. To each IO-link device-side ports 6a-6d, there is connected exactly one of the IO-link devices 2a-2d through a cable 28. To allow the connection, the IO-link devices 2a-2d each have a device IO-link port 24 thereon. Using the switch device 1, it is effectively possible to connect several (here four) IO-link devices 2a-2d to a single master port 4 of the IO-link master 3.

Between each of the IO-link device-side ports 6a-6d and the respective IO-link devices 2a-2d, a field device communication channel FCC is established to allow a communication between the respective IO-link field devices 2a-2d and the switch device 1. The communication through the field device communication channels FCC is bidirectional: the IO-link devices 2a-2d can each transfer data towards the switch device 1 in an upstream transmission direction U and receive information from the switch device 1 in a downstream transmission direction D. The switch device 1 comprises a field device switch 32 for controlling the communication between the master device 3 and the field devices 2a-2d.

A communication protocol used for the communication between the individual IO-link devices 2a-2d and the switch device 1 is identical to the communication protocol used for the communication between the switch device 1 and the IO-link master 3. Namely, the communication protocol is an IO-link communication protocol according to the IO-link standard. Since a unique communication protocol is used in the lower level network 19, raw data transmitted between the IO-link master 3 and the IO-link device 2a-2d does not have to be converted in the switch device 1, thereby facilitating the data transfer. A point-to-point communication SDCI communication is performed between the IO-link master 3 and the respective IO-link devices 2a-2d each in terms of an IO-link channel.

Data is transferred between the IO-link master 3 and the IO-link devices 2a-2d cyclically and acyclically. Namely, process data is sent cyclically in sequences comprising data frames and including a downstream message from the IO-link master 3 and an upstream message from the IO-link device 2a-2d. On request data is sent acyclically by the IO-link devices 2a-2d only when they receive a request from the IO-link master 3. Finally, events such as failures or anomalies are signalized by the IO-link devices 2a-2d acyclically.

Data does not have to be transmitted using the IO-link protocol between the IO-link devices 2a-2d and the IO-link master 3; it may also be transmitted as analog and/or digital data between the IO-link devices 2a-2d and the IO-link master 3.

Figure 2:
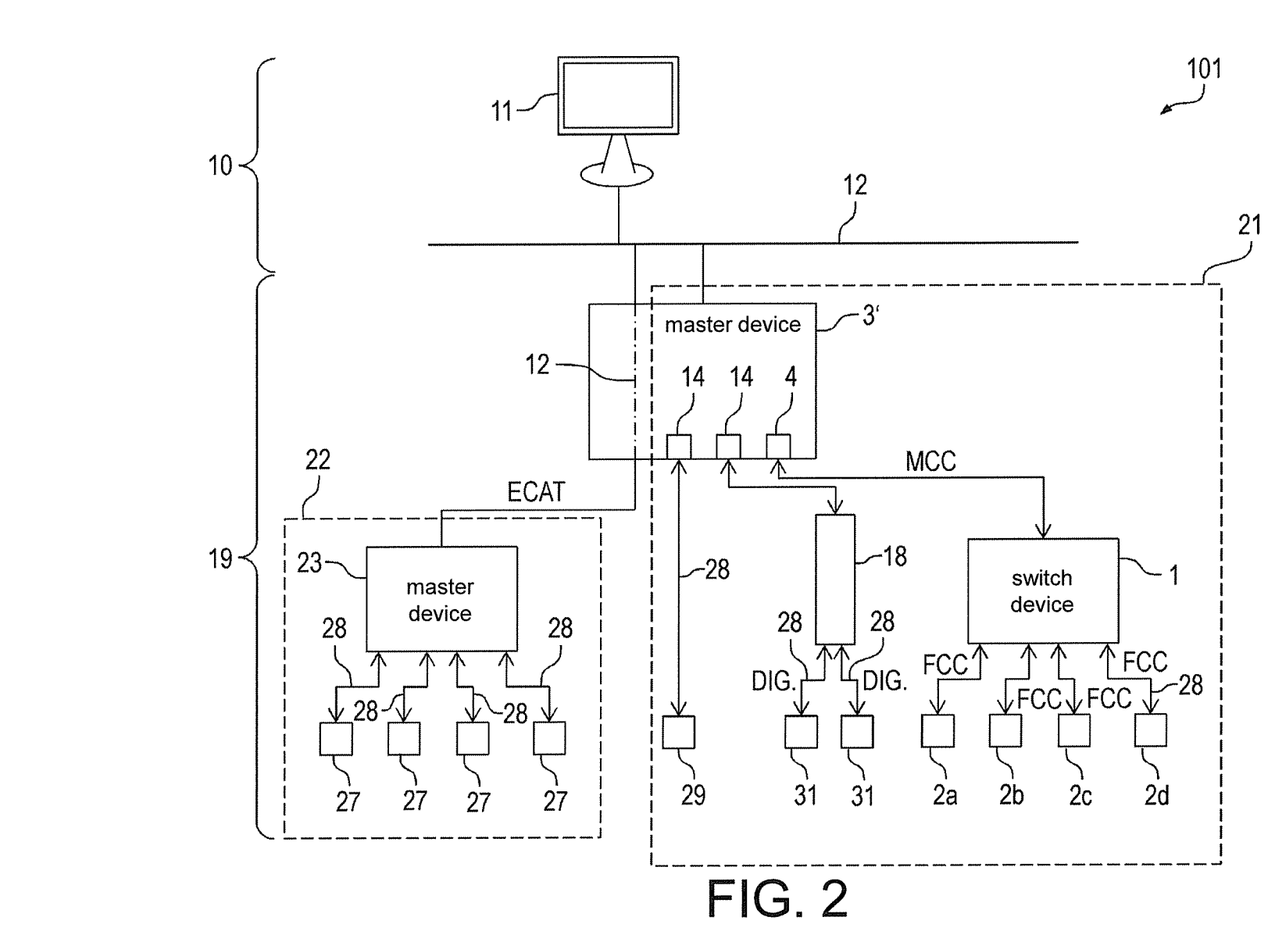
FIG. 2 shows an automation network according to a second embodiment.

FIG. 2 shows an automation network 101 according to a second embodiment. The automation network 101 strongly resembles to the automation network 100 according to the first embodiment. The main difference between the two embodiments is that a different master device is used in the automation network 101 shown in FIG. 2. Namely, in FIG. 2, the master device 3' is also an IO-link master but differs from the IO-link master 3 of FIG. 1 in that it comprises only three ID-link master ports 4, 14. In the second embodiment, there are various entities connected to the master ports 4, 14 of the IO-link master 3', which are known from the prior art and provide different options for connecting field devices, in particular IO-link devices, to the master ports of the IO-link master.

Further, in the automation network 101 according to the second embodiment, a second master device 23 is coupled with the upper-level network 10. Namely, the second master device 23 is connected to the fieldbus 12 through the IO-link master 3' as known from prior art. The field bus 12 can be an EtherCAT fieldbus, an Ethernet/IP fieldbus, a Profibus fieldbus, an Interbus fieldbus or the like. In the example of FIG. 2, the fieldbus 12 is an EtherCAT fieldbus ECAT. The second master device 23 is also an IO-link master, which is generally identical to the IO-link master 3 detailed above. In particular, the second IO-link master 23 also has four ports (not shown), to which four field devices 27 are connected, the field devices 27 also being IO-link devices. A communication between the second IO-link master 23 and the individual IO-link devices 27 can be performed using the IO-link protocol. However, a communication indicated by the dot-and-dash line between the IO-link master 3' and the second IO-link master 23 is not performed using the IO-link protocol. Rather, the communication path passes the IO-link master 3' and couples with the second IO-link master 23 over the EtherCAT fieldbus ECAT. Hence, the type of communication between the IO-link master 3' and the IO-link master 23 is not the same as the communication protocol between the IO-link master 23 and the field devices 27.

Moreover, EtherCAT connections are particularly expensive and require an elaborated set-up. Therefore, the use of two IO-link masters 3', 23 in the lower level network 19 is more expensive than using the switch device 1 to increase the number of available master ports in an automation network. Further, using the switch device 1 allows to simplify the network 102. Further, the use of two IO-link masters accounts for the existence of two separate IO-link systems 21 and 22, each comprising one of the IO-link masters 3', 23. In contrast, the switch device 1, explained in more detail below, only switches IO-link channels to the IO-link devices 2a-2d.

Further, in FIG. 2, the first master port 14 starting from the left is directly connected to another IO-link device 29 via a cable 28, as known from the prior art. Using this type of connection, the number of IO-link devices that can physically be connected to a single master port of the IO-link master is limited to one.

The second master port 14 is connected to a digital hub 18 through a cable 28, as known from the prior art. The digital hub 18 itself is connected to two conventional, non-intelligent sensors 31 such as temperature and pressure sensors. The sensors 31 communicate digital data DIG to the digital hub 18 through the cables 28 and do not provide any IO-link functionality. However, the communication between the sensors 31 and the digital hub 18 does not make use of the IO-link protocol. On the other hand, the communication between the IO-link master 3 and the digital hub 18 is performed according to the IO-link protocol. Therefore, the digital hub 18 needs to perform a conversion to bring the digital data from the sensors 31 to the IO-link master 3'. Further, the digital hub 18 does not allow a control of the field devices, in particular of the sensors 31 connected thereto by the IO-link master 3'.

The master port 4 of the IO-link master 3' is connected to the switch device 1 in an identical manner as described above with respect to FIG. 1. In FIG. 2, all communication channels in the lower level network 19 can be used for communication using the IO-link communication protocol, except for the channel labelled "ECAT" indicating an EtherCAT communication and for the channels "DIG", indicating a digital communication.

Figure 3:
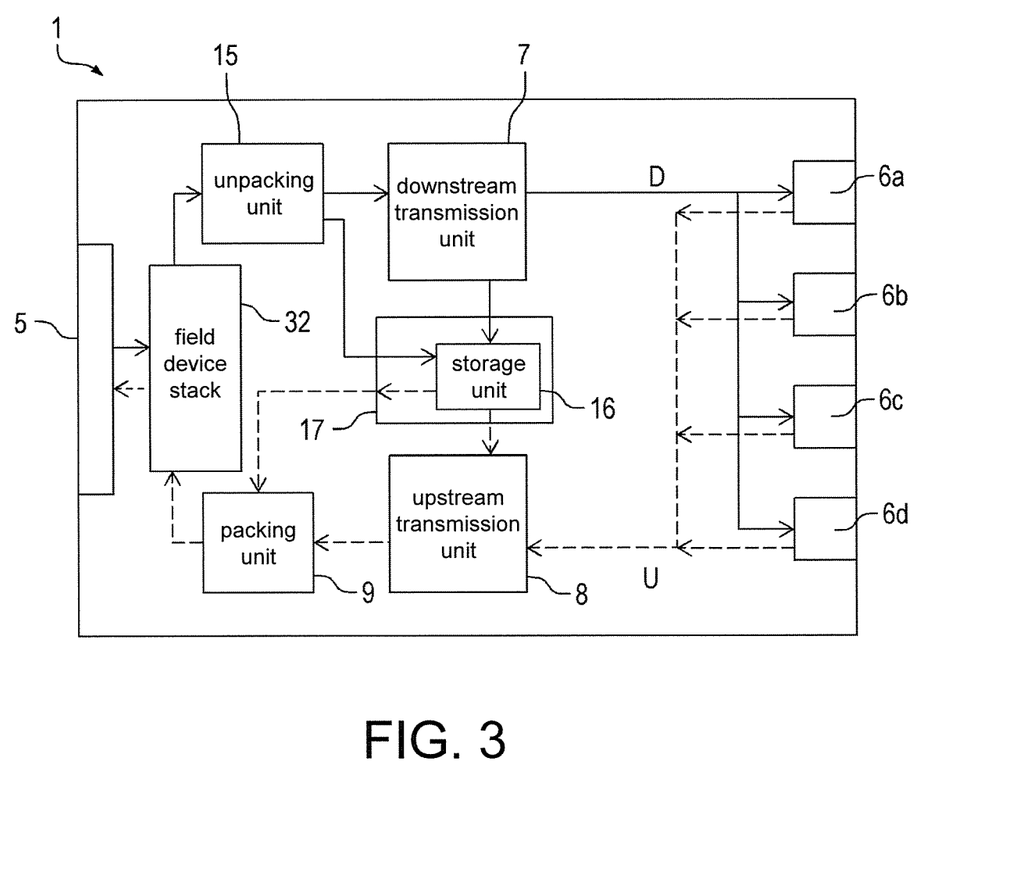
FIG. 3 shows a switch device according to a first embodiment.

FIG. 3 shows a switch device 1 according to a first embodiment. The switch device 1 can be placed between the IO-link master 3 or 3' and the IO-link devices 2a-2d in the automation networks 100 or 101 shown in FIGS. 1 and 2.

The switch device 1 comprises the already described IO-link field device side ports 6a-6d, the master-side port 5 and the field device stack 32. Beyond this, the switch device 1 comprises a downstream transmission unit 7, an upstream transmission unit 8. Optionally, the switch device 1 can also comprise a configuration unit 17 linked with a storage unit 16, a packing unit 9 and an unpacking unit 15. In FIG. 3, the upstream data flow U is indicated by dotted arrows while the downstream data flow D is indicated by continuous arrow.

The downstream data transmitted from the IO-link master 3 to the IO-link devices 2a-2d is received at the master-side port 5. The downstream data is received as a downstream data packet comprising a plurality of downstream messages for the individual IO-link devices 2a-2d. Upon reception of the downstream data packet by the master-side port 5, it is transmitted to the unpacking unit 15 of the switch device 1 via the field device stack 32 which controls the communication of data in the switch device 1. The unpacking unit separates the downstream data packet into the individual downstream messages, and transmits these to the transmission unit 7.

Each downstream message may have a destination information associated thereto, for example in a header of a frame, which is read out by the transmission unit 7. The transmission unit 7 then transmits the individual downstream messages towards one of the IO-link device-side ports 6a-6d in accordance with the read destination information. For example, if the destination information indicates that the downstream message is for the IO-link device 2c, the transmission unit 7 transmits the downstream message to the IO-link field device-side port 6c, which will in turn transfer the downstream message to the selected IO-link device 2c.

In FIG. 3, the transmission unit 7 is connected to a storage unit 16 of a configuration unit 17. The storage unit 16 comprises, amongst others, information indicating which IO-link device 2a-2d is connected to which IO-link device-side port 6a-6d as a field device configuration parameter. In other words, it indicates that the IO-link device 2a is connected to the IO-link field device-side port 6a and so on. The information stored in the storage unit 16 is used by the downstream transmission unit 7 to determine the IO-link device side ports 6a-6d to which a certain downstream message should be transmitted to.

The upstream data transmitted from the IO-link devices 2a-2d to the IO-link master 3 is received at the respective IO-link field device-side ports 6a-6d. The upstream data is received as an individual upstream message at the IO-link device-side ports 6a-6d and are then transmitted to the upstream transmission unit 8 of the switch device. Based on the field device configuration parameters stored in the storage unit 16 and indicating which IO-link device 2a-2d is connected to which IO-link device-side port 6a-6d, the upstream transmission unit 8 associates, to each upstream message, an originator information indicating which IO-link device 2a-2d the upstream message comes from. The originator information is written into the header of the upstream message.

Then, the upstream message is transmitted, together with its originator information from the upstream transmission unit 8 to the packing unit 9. The packing unit 9 groups together several of the received upstream messages, including their originator information, into a single upstream data packet and transmits the upstream data packet towards the master-side port 5 for transmission to the IO-link master 3.

The IO-link master 3 can unpack the received upstream data packet and associate the individual upstream messages to the IO-link field devices 2a-2d using the originator information and information about the IO-link system 20 that is mapped in the IO-link master 3.

The configuration unit 17 is also used for setting up the IO-link system, in particular when first connecting the switch device 1 to the IO-link master 3, and when first connecting the IO-link devices 2a-2d to the switch device 1. When first connecting the switch device 1 to the IO-link master 3, the IO-link master 3 receives, from the configuration unit 17 of the switch device, information indicating that a switch device 1 is connected to the IO-link master 3. Then, the configuration unit 17 of the switch device 1 receives master configuration parameters including the master transmission rates defined by the IO-link standard and the master cycle time through the master-side port 5. These configuration parameters are stored in the storage unit 16 and taken into account by the upstream transmission unit 8 and the packing unit 9 when transmitting upstream data.

In specific embodiments, when the IO-link devices 2a-2d are first connected to the switch device 1 (see FIG. 1 or 2), the IO-link master 3 obtains information from the IO-link devices 2a-2d through the switch device 1, in particular addresses of the IO-link devices 2a-2d, allowing the IO-link master 3 to register the IO-link devices 2a-2d in an IO-link master stack (not shown). Based on the registered IO-link devices 2a-2d, the IO-link master 3 configures the switch device 1. Therein, the IO-link master 3 communicates addresses of the IO-link devices 2a-2d to the configuration unit 17 of the switch device 1 as well as other field device configuration parameter. The other field device configuration parameters, which are here IO-link device configuration parameters, include information indicating which IO-link device 2a-2d is connected to which IO-link device-side port 6a-6d, an IO-link transmission rate as a field device transmission rate and an IO-link cycle time as the field device cycle time of each IO-link device. These IO-link device configuration parameters are stored in the storage unit 16 and used by the downstream transmission unit 7 when transmitting downstream data to the IO-link devices 2a-2d in an operational mode. For example, if the configuration parameters relating to the IO-link device 2b indicate that said IO-link device 2b supports a transmission rate of 38.4 kbaud, a data transmission to the IO-link device 2b will be made at this precise transmission rate.

Figure 4:
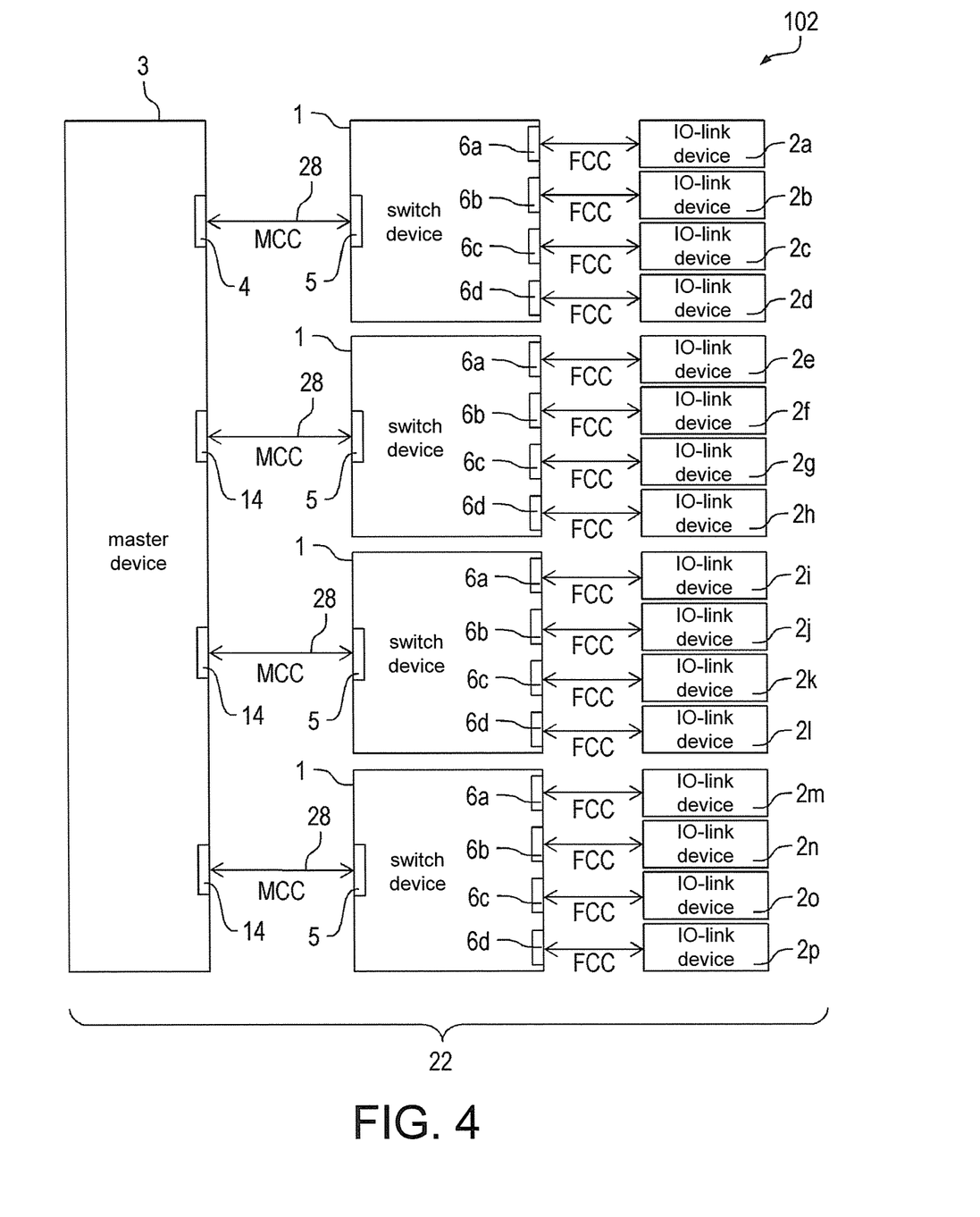
FIG. 4 shows a part of an automation network according to a third embodiment.

FIG. 4 shows a part of an automation network according to a third embodiment. In particular, FIG. 4 shows an IO-link system 22 forming the lower level network 19 and comprising the IO-link master 3, four switch devices 1 as described in view of FIGS. 1 to 3 and sixteen IO-link devices 2a-2p. The IO-link system 22 of FIG. 4 differs from the IO-link system 20 of FIG. 1 in that the three master ports 14 are also connected to switch devices 1.

Namely, to each of the four ports 4, 14 of the IO-link master 3, there is connected exactly one switch device 1 through a cable 28, thereby establishing master communication channels MCC between the respective master ports 4, 14 and the master-side ports 5 of the different switch devices 1. As the switch devices 1 of FIGS. 1 to 3, the four switch devices 1 of FIG. 4 each have four IO-link device-side ports 6a-6d for connecting the IO-link devices 2a-2p. The IO-link devices 2a-2p can be field devices of any type. Between each IO-link device 2a-2p and the corresponding IO-link device-side ports 6a-6d, a field device communication channel FCC is established, as detailed above. The communication between the IO-link master 3 and the IO-link devices 2a-2p is performed with the IO-link protocol.

In the IO-link system 22 in FIG. 4, sixteen IO-link devices 2a-2p can be connected to only four master ports 4, 14 of the IO-link master 3, thereby increasing the size of the IO-link system 22 considerably.

Figure 5:
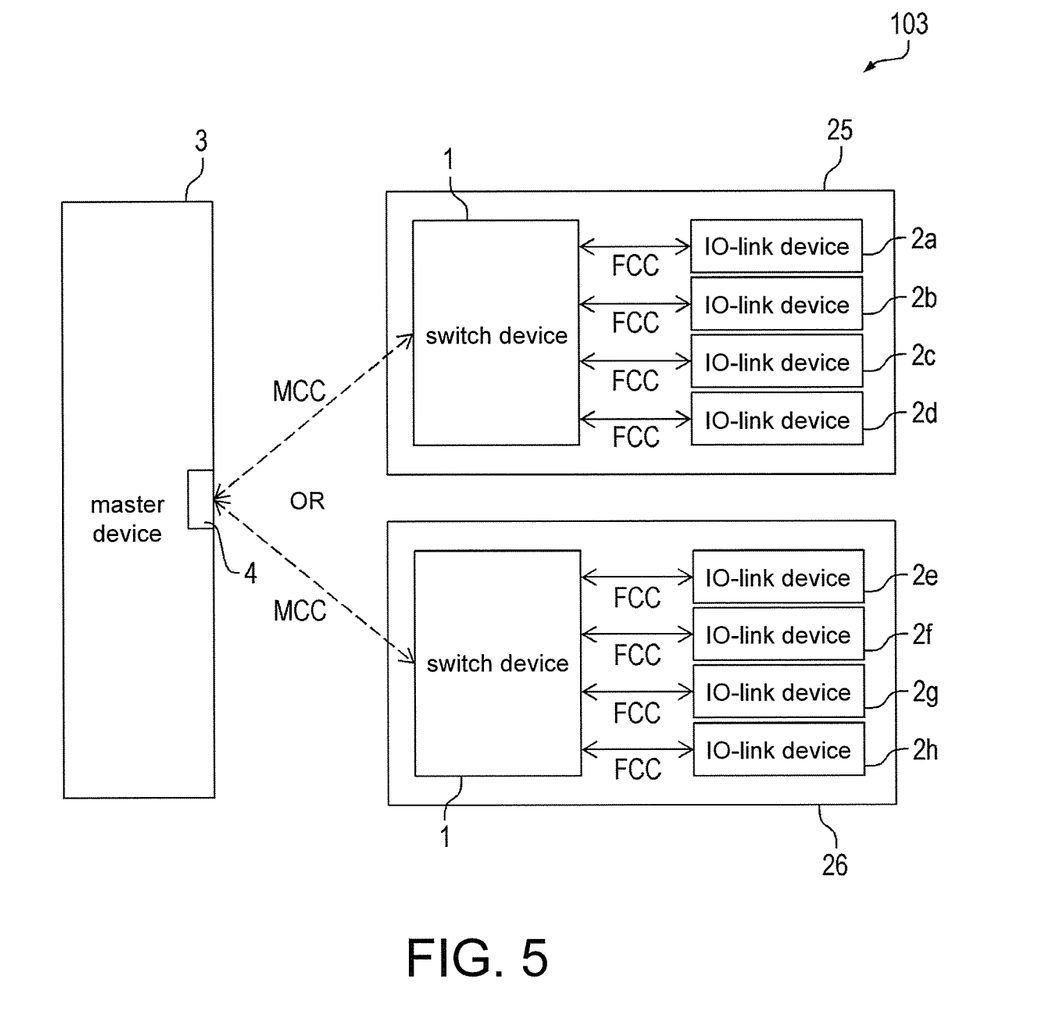
FIG. 5 shows a part of an automation network according to a fourth embodiment.

FIG. 5 shows a part of an automation network 103 according to a fourth embodiment. In detail, FIG. 5 shows two alternative robot heads 25, 26, which can be connected to the master port 4 of the IO-link master 3. The first robot head 25 comprises the switch device 1 described above in view of FIGS. 1 to 3, which is connected to the IO-link devices 2a-2d for a communication through the respective field device communication channels FCC. The second robot head 26 comprises the switch device 1 described above in view of FIGS. 1 to 3, which is connected to the IO-link devices 2e-2h for a communication through the respective field device communication channels FCC. The first and second robot heads 25, 26 are pre-mounted.

One of the first or the second robot head 25, 26 is selected, for example by a user, and is connected to the master port 4 of the IO-link master 3, thereby establishing a communication through the master communication channel MCC between the selected robot head 25, 26 and the IO-link master 3. Meanwhile, the other robot head 25, 26 is not used. When the user desires to change the tools connected to the IO-link master 3, he can change the robot head 25, 26, without having to disconnect the individual IO-link devices 25, 26. Thereby, a change of the robot head 25, 26 is facilitated.

Although the present invention has been described in accordance with preferred embodiments, it is obvious for the person skilled in the art that modifications are possible in all embodiments. For example, the amount of master ports and field device-side ports can be chosen arbitrarily. The automation network may comprise different elements such as storage devices and the like. The communication between the master device and the field devices can be performed wirelessly instead of using cables. Any kind of field devices may be used. A protocol that is different from the IO-link protocol may be used for the communication between the master device and the field devices. The configuration parameters may include more parameters relating to the field devices and/or master devices.

The invention claimed is:

1. A switch device for connecting a plurality of field devices to one single master port of a master device, the master device providing a gateway between the plurality of field devices and an upper level network and being configured to control a communication between the upper level network and the plurality of field devices, the switch device comprising:
    a physical master-side port for connecting the switch device to the single master port and for establishing a master communication channel (MCC) between the master device and the switch device; and
    a plurality of physical field device-side ports for connecting the switch device to the plurality of field devices and for establishing a plurality of field device communication channels (FCC) between the respective field devices and the switch device;
    wherein the switch device is configured to transfer data between the master device and the plurality of field devices through the master communication channel (MCC) and the plurality of field device communication channels (FCC) using a single communication protocol for an automation network;
    the switch device is configured to be provided between the master-side port and the plurality of field device-side ports,
    the switch device is configured to cyclically or acyclically transmit downstream data received from the master device at the master-side port to a selected field device-side port selected from the plurality of field device-side ports, the selected field device-side port being selected in accordance with a destination information received with the downstream data and indicating the field device to which the downstream data is destined to, and/or
    cyclically or acyclically transmit upstream data received from one of the field devices at the corresponding field device-side port to the master-side port, and
    the switch device further comprises a memory for storing configuration data, including at least one of:
    a field device transmission rate for each of the field device-side ports indicating a rate at which data can be transmitted through the respective field device communication channels (FCC) in agreement with a transmission rate supported by the corresponding field devices;
    a master transmission rate for the master-side port indicating a rate at which data can be transmitted through the master communication channel (MCC) in agreement with a transmission rate supported by the master device;
    a master cycle time indicating a time it takes to transmit downstream or upstream data between the master device and the switch device through the master communication channel (MCC); and
    a field device cycle time indicating a time it takes to transmit downstream or upstream data between one of the field devices and the switch device through the corresponding field device communication channel (FCC).

2. The switch device according to claim 1, wherein the communication protocol is an IO-link communication protocol.

3. The switch device according to claim 1, wherein the master device is an IO-link master device and at least one field device from the plurality of field devices is an IO-link device.

4. The switch device according to claim 1, wherein the downstream data received from the master device at the master-side port is a downstream data packet comprising a plurality of downstream messages each having a downstream message information associated thereto as the destination information; and wherein
    the switch device is further configured to unpack the downstream messages of the downstream data packet and to transmit them to the switch device together with their respective downstream message information.

5. The switch device according to claim 1, wherein the switch device is configured to transmit the upstream data to the master-side port together with an originator information indicating which field device the upstream data originates from.

6. The switch device according to claim 1, wherein the upstream data received from the respective field devices at the corresponding field device-side ports is an upstream message; and wherein
    the switch device is further configured to pack-up at least two upstream messages received from at least two field-devices through the corresponding field device-side ports into an upstream packet, and to transmit said upstream packet to the master-side port.

7. The switch device according to claim 6, wherein the packing-up of the at least two upstream messages into an upstream packet includes a compressing or an encapsulation of the at least two upstream messages by the switch device.

8. The switch device according to claim 1, the switch device is further configured to set a field device configuration parameter for each field device connected to the switch device, the field device configuration parameter including at least one of the field device transmission rate and the field device cycle time of each field device, and/or set a master configuration parameter for the master device connected to the switch device, the master configuration parameter including at least one of the master transmission rate and the master cycle time.

9. The switch device according claim 1, wherein the master communication channel (MCC) and/or the field device communication channel (FCC) are set up under consideration of at least one of the field device transmission rate, the master transmission rate, the master cycle time and the field device cycle time.

10. The switch device according to claim 1, the switch device is further configured to control the transmission of data between the master device and the field devices.

11. The switch device according to claim 2, wherein the master device is an IO-link master device and at least one field device from the plurality of field devices is an IO-link device.

12. The switch device according to claim 2, wherein the downstream data received from the master device at the master-side port is a downstream data packet comprising a plurality of downstream messages each having a downstream message information associated thereto as the destination information; and wherein
 the switch device is further configured to unpack the downstream messages of the downstream data packet and to transmit them to the switch device together with their respective downstream message information.

13. The switch device according to claim 3, wherein the downstream data received from the master device at the master-side port is a downstream data packet comprising a plurality of downstream messages each having a downstream message information associated thereto as the destination information; and wherein
 the switch device is further configured to unpack the downstream messages of the downstream data packet and to transmit them to the switch device together with their respective downstream message information.

14. The switch device according to claim 2, wherein the switch device is configured to transmit the upstream data to the master-side port together with an originator information indicating which field device the upstream data originates from.

15. The switch device according to claim 3, wherein the switch device is configured to transmit the upstream data to the master-side port together with an originator information indicating which field device the upstream data originates from.

16. The switch device according to claim 4, wherein the switch device is configured to transmit the upstream data to the master-side port together with an originator information indicating which field device the upstream data originates from.

17. The switch device according to claim 2, wherein the upstream data received from the respective field devices at the corresponding field device-side ports is an upstream message; and wherein
 the switch device is further configured to pack-up at least two upstream messages received from at least two field-devices through the corresponding field device-side ports into an upstream packet, and to transmit said upstream packet to the master-side port.

18. An automation network comprising:
 an upper level network;
 a plurality of field devices;
 a master device providing a gateway between the plurality of field devices and the upper level network and being configured to control a communication between the upper level network and the plurality of field devices; and
 the switch device according to claim 1.

19. The automation network according to claim 18, wherein the master device is further configured to control the transmission of data between the master device and the switch device.

* * * * *